United States Patent
Law et al.

(10) Patent No.: US 12,020,444 B2
(45) Date of Patent: Jun. 25, 2024

(54) PRODUCTION LINE MONITORING METHOD AND MONITORING SYSTEM THEREOF

(71) Applicant: POWERARENA HOLDINGS LIMITED, Tortola (VG)

(72) Inventors: Kin Lun Law, Tai Po (HK); Chi Hang Wong, Shatin (HK)

(73) Assignee: POWERARENA HOLDINGS LIMITED, Tortola (VG)

(*) Notice: Subject to any disclaimer, the term of this patent is extended or adjusted under 35 U.S.C. 154(b) by 0 days.

(21) Appl. No.: 18/462,441

(22) Filed: Sep. 7, 2023

(65) Prior Publication Data

US 2023/0419509 A1   Dec. 28, 2023

Related U.S. Application Data

(62) Division of application No. 17/238,162, filed on Apr. 22, 2021, now Pat. No. 11,790,538.

(30) Foreign Application Priority Data

Nov. 5, 2020 (CN) .......................... 202011221185.0

(51) Int. Cl.
*G06T 7/246* (2017.01)
*G06T 7/00* (2017.01)
(Continued)

(52) U.S. Cl.
CPC ............ *G06T 7/246* (2017.01); *G06T 7/0004* (2013.01); *G06T 7/215* (2017.01); *G06V 20/49* (2022.01);
(Continued)

(58) Field of Classification Search
CPC .......... G06T 2207/20081; G06T 7/215; G06T 2200/24; G06T 7/70; G06T 7/246;
(Continued)

(56) References Cited

U.S. PATENT DOCUMENTS 10,769,718 B1 *   9/2020   Nunn ...................... G06T 7/194
2013/0226643 A1 * 8/2013 Sakaue .......... G06Q 10/063114
                                                              705/7.15
(Continued)

FOREIGN PATENT DOCUMENTS

JP        2005242418 A  *  9/2005

OTHER PUBLICATIONS

Human motion recognition for industrial human-robot collaboration based on a novel skeleton descriptor—Aug. 2020 (Year: 2020).*
Learning-Based Hand Motion Capture and Understanding in Assembly Process—2018 (Year: 2018).*

*Primary Examiner* — Nizar N Sivji
(74) *Attorney, Agent, or Firm* — WPAT LAW; Anthony King

(57) ABSTRACT

A production line monitoring method and a monitoring system thereof are provided. The monitoring system is configured to obtain a plurality of images of an operator, determine a motion type of the operator in the plurality of images based on an image recognition model, determine a time of occurrence and a motion period of the motion type, and record the time of occurrence and the motion period of the motion type.

2 Claims, 21 Drawing Sheets

(51) Int. Cl.
*G06T 7/215* (2017.01)
*G06V 20/40* (2022.01)

(52) U.S. Cl.
CPC .............. *G06T 2207/20081* (2013.01); *G06T 2207/30232* (2013.01); *G06V 2201/07* (2022.01)

(58) Field of Classification Search
CPC ........ G06T 7/0004; G06T 2207/30232; G06N 20/00; G06N 5/045; G06N 3/04; G06N 3/08; G06V 20/20; G06V 20/52; G06V 20/49; G06V 2201/07; G06V 40/20; Y02P 90/30
See application file for complete search history.

(56) References Cited

U.S. PATENT DOCUMENTS

| | | | | |
|---|---|---|---|---|
| 2015/0248917 A1* | 9/2015 | Chang | .................. | G11B 27/031 386/282 |
| 2017/0257603 A1* | 9/2017 | Voyer | .................... | G06T 7/0002 |
| 2020/0300778 A1* | 9/2020 | Hoshino | .............. | G06V 10/945 |
| 2021/0056508 A1* | 2/2021 | Lassalle | ............... | G06Q 10/101 |
| 2021/0304104 A1* | 9/2021 | Okamura | ................ | G06V 20/52 |
| 2022/0375056 A1* | 11/2022 | Weiss | ........................ | G06T 7/11 |
| 2022/0392055 A1* | 12/2022 | Do | ........................... | G06T 7/269 |
| 2023/0024500 A1* | 1/2023 | Man | ........................ | G06V 10/82 |

* cited by examiner

Receiving a user setting for defining a monitoring region in a video needing to be captured  
S517

FIG. 5F

Receiving a user setting for moving a monitoring region  
S518

FIG. 5G

PRODUCTION LINE MONITORING METHOD AND MONITORING SYSTEM THEREOF

TECHNICAL FIELD

The present invention relates to a production line monitoring method and a monitoring system thereof, and more particularly, to a production line monitoring method and a monitoring system thereof based on machine learning technology.

DISCUSSION OF THE BACKGROUND

In a manufacturing process of conventional industry products, the assembly of parts of various devices still require manual assistance. More specifically, numerous parts need to be provided in one single device, and the assembly of the different parts on the device is usually completed by operating staff at various stations of a factory production line.

However, delays caused by operation errors or all kinds of reasons frequently result in an output bottleneck of a production line. Thus, a monitoring device is needed for a production line to record and ascertain reasons resulting in the output bottleneck of the production line so as to improve subsequent efficiency.

Nonetheless, most conventional monitoring devices provide merely an image recording function. In the occurrence of a situation in a production line, searching through recorded images of the production line and accordingly determining factors of errors or delays by manual means are yet commonly needed.

SUMMARY

A production line monitoring method for a monitoring system is provided according to some embodiments of the present invention. The method includes: obtaining a plurality of images of an operator, determining a motion type of the operator in the plurality of images based on an image recognition model, determining a time of occurrence and a motion period of the motion type, and recording the motion type, the time of occurrence and the motion period.

A production line monitoring method for a monitoring system is provided according to some embodiments of the present invention. The method includes: obtaining a video, the video including a plurality of video clips; determining a motion type of each of the video clips based on an image recognition model; receiving a user setting to change the motion type of a first video clip of the plurality of video clips; and adjusting the image recognition model according to the motion type of the first video clip.

A monitoring system for monitoring a production line is provided according to some embodiments of the present invention. The monitoring system includes a processor and a storage unit. The storage unit stores a program and an image recognition model. The program, when being executed, causes the processor to: obtain a plurality of images of an operator; determine a motion type of the operator in the plurality of images based on the image recognition model, determine a time of occurrence and a motion period of the motion type, and record the motion type, the time of occurrence and the motion period.

The features and technical advantages of the present invention are in general summarized in the description above so as to better understand the following implementation forms of the present invention. In the disclosure below, other features and advantages of the present invention are described, and these features and advantages form the subject matter of the claims of the present invention. A person skilled in the art should understand that, the disclosed concept and specific embodiments can be easily used for modifications or designs as the basis for implementing other structures or processes of the same object of the present invention. A person skilled in the art should further acknowledge that such equivalent structures do not depart from the sprit and scope of the present invention as described in the appended claims.

BRIEF DESCRIPTION OF THE DRAWINGS

Various aspects of the present invention can be better understood according to the following detailed description by going through the detailed description with the accompanying drawings. It should be noted that, the features are not drawn to scale according to standard practices in industry. In fact, for the clarity of the discussion, the sizes of the various features can be increased or decreased as desired.

When considered in combination with the accompanying drawings, the present invention can be more thoroughly understood with reference to the detailed description and the claims. Throughout the drawings, similar reference numerals refer to similar elements.

FIGS. 5A to 5G are flowcharts of a production line monitoring method according to some embodiments of the present invention.

DETAILED DESCRIPTION

Figure 1A:
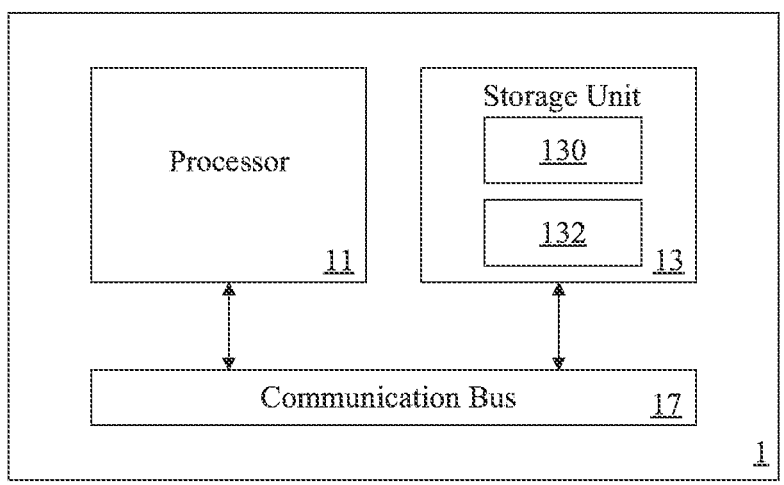
FIG. 1A is a block diagram of a monitoring system according to some embodiments of the present invention.

Specific terms are used herein to describe the embodiments or examples of the present invention shown in the accompanying drawings, and it should be understood that, these terms are not to be construed as limitations to the scope of the present invention. For a person skilled in the art pertinent to the present invention, any changes or modifications made to the described embodiments and any further applications of the principles described in the present disclosure are considered to occur normally. The reference numerals can be repeated in an entire embodiment, which however does not mean that one or more features of one embodiment are applicable to another embodiment, even if these embodiments share the same reference numerals.

It should be understood that, although terms such as first, second and third are used herein to describe various elements, components, regions, layers or parts, these elements, components, regions, layers and parts are not limited by such terms. Conversely, these terms are merely used to distinguish one element, component, region, layer or part from another element, component, region, layer or part. Therefore, without departing from the teaching of the concept of the present invention, a first element, component, region, layer or part discussed hereinafter can also be referred to as a second element, component, region, layer or part.

The terms used herein are merely for describing specific exemplary embodiments and are not to be construed as limitations to the concept of the present invention. As used herein, unless otherwise explicitly specified in the context, the singular form "a/an" and "the" are intended to cover the plural form. It should be further understood that, the term "comprise/comprising" used in the specification points out the existence of the described feature, integer, step, operation, element or component, but does not rule out the existence or addition of one or more other features, integers, steps, operations, elements, components or any combination thereof.

The delay caused by manual operation errors or other factors in a production line frequently results in an output bottleneck of the production line. However, a conventional monitoring device for a production line simply records images, and so searching through images and identifying factors resulting in the errors or delays still need to be performed by manual means—such error detection method yields poor efficiency and application flexibilities and fails to effectively improve the output bottleneck of the production line. Therefore, in order to more quickly and accurately locate factors resulting in errors or delays in a production line to further enhance output efficiency of the production line, a novel monitoring method and monitoring system are needed.

FIG. 1A is a block diagram of a monitoring system 1 according to some embodiments of the present invention. The monitoring system 1 includes a processor 11 and a storage unit 13. The storage unit 13 stores a program 130 and an image recognition model 132. The image recognition model 132 may include a model associated with machine learning technology. Furthermore, the image recognition model 132 may be a machine learning model generated using a plurality of sets of training data according to a machine learning algorithm.

More specifically, in some embodiments, some image data and motion types corresponding to the image data may be used as training data for training the image recognition model 132 based on a machine learning algorithm (i.e., for generating the image recognition model 132). Thus, the image recognition model 132 may be used to receive the image data and output the motion type of an operator in the images. For example, the image recognition model 132, after receiving an image sequence of an operator, determines that the operator is currently performing a motion "picking up" or "putting down", and outputs a motion type as "picking up" or "putting down".

The processor 11 and the storage unit 13 are electrically connected by a communication bus 17. Through the communication bus 17, the processor 11 may execute the program 130 stored in the storage unit 13. One or more interrupts, e.g., a software interrupt, can be generated when the program 130 is executed, to cause the processor 11 to execute the program 130 having a production line monitoring function. The function of the program 130 is further described below.

Figure 1B:
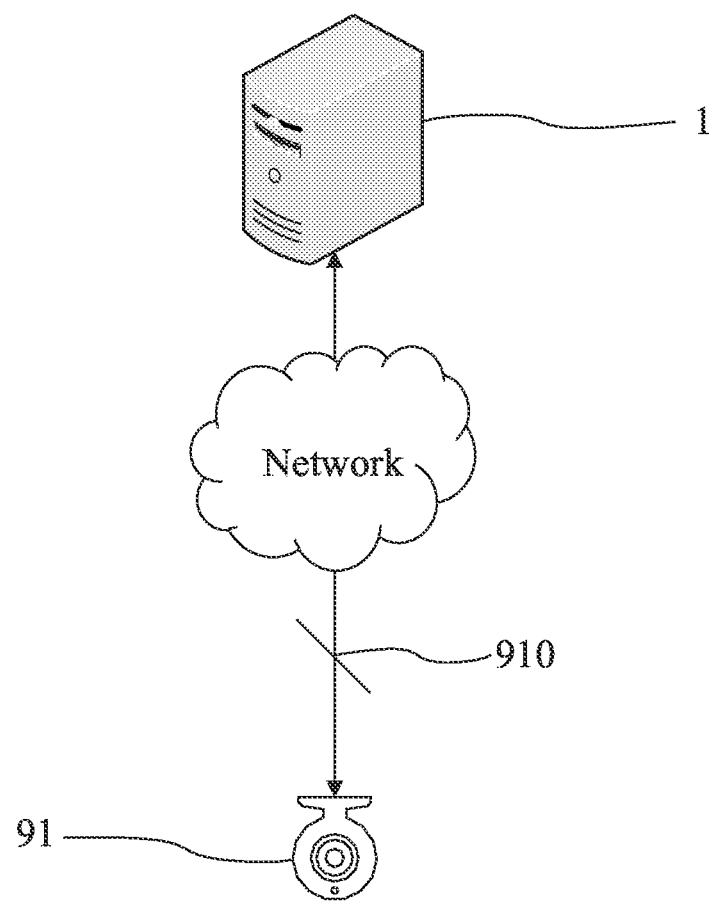
FIG. 1B is a schematic diagram of use of a monitoring system according to some embodiments of the present invention.
Figure 1B:
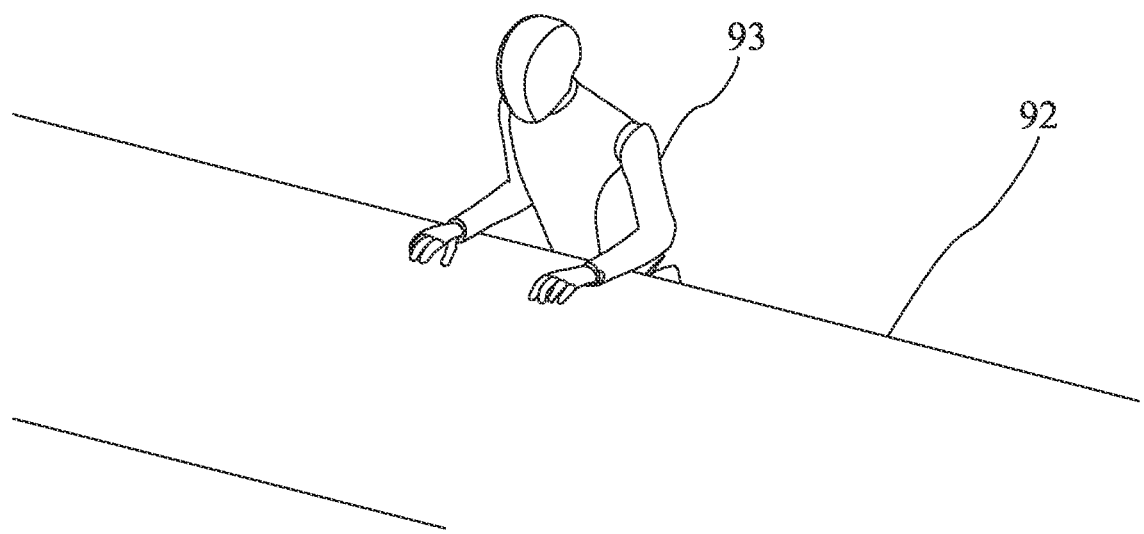

FIG. 1B is a schematic diagram of use of the monitoring system 1 according to some embodiments of the present invention. Specifically, when the operation of a production line machine 92 needs to be monitored and analyzed, an image capturing device 91 may be installed in an environment where the production line machine 92 is located, so as to capture images associated with the production line machine 92. The monitoring system 1 may be connected to the image capturing device 91 by a network connection (a wired network or a wireless network).

In some embodiments, when an operator 93 operates on the production line machine 92, the image capturing device 91 may capture a plurality of images 910 of the operator 93 with respect to the position of the production line machine 92, and send the plurality of images 910 to the monitoring system 1 through the network. In other words, the monitoring system 1 may obtain the plurality of images 910 of the operator 93 from the image capturing device 91.

Next, by using the image recognition model 132 generated and stored in the storage unit 13, the processor 11 of the monitoring system 1 may determine a motion type of the operator 93 in the plurality of images 910. The plurality of images 910 carry information associated with timestamps so that the processor 11 may determine capturing timings of the plurality of images 910, and further determine a time of occurrence and a motion period of the motion type represented by the plurality of images 910. The processor 11 may record the motion type, the time of occurrence and the motion period in the storage unit 13 for subsequent use.

Figure 2A:
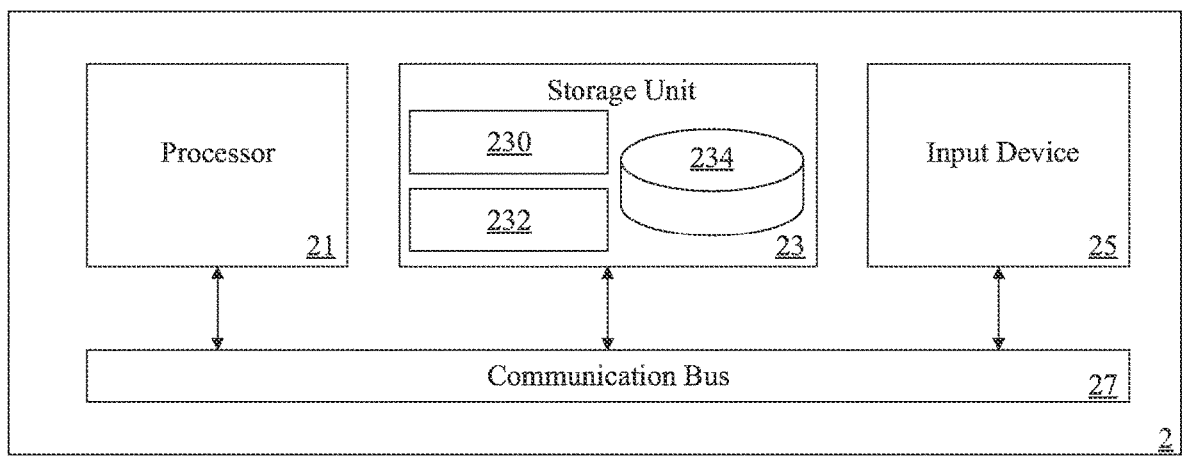
FIG. 2A is a block diagram of a monitoring system according to some embodiments of the present invention.

FIG. 2A is a block diagram of a monitoring system 2 according to some embodiments of the present invention. The monitoring system 2 includes a processor 21, a storage unit 23 and an input device 25. The storage unit 23 stores a program 230, an image recognition model 232 and training data 234. The image recognition model 232 may include a model associated with machine learning technology, and is used to receive video data (i.e., image sequence data) and output a motion type of an operator in a video.

The processor 21, the storage unit 23 and the input device 25 are electrically connected by a communication bus 27. Through the communication bus 27, the processor 21 may execute the program 230 stored in the storage unit 23. One or more interrupts, e.g., a software interrupt, can be generated when the program 230 is executed, to cause the processor 21 to execute the program 230 having a production line monitoring function. The function of the program 230 is to be further described below.

In some embodiments, the image recognition model 232 may be a machine learning model generated using a plurality of sets of training data 234 according to a machine learning algorithm. Specifically, some video data and motion types corresponding to the video data may be used as training data for training the image recognition model 232 based on a machine learning algorithm (i.e., for generating the image recognition model 232).

More specifically, each set of training data 234 may include (1) video data, and (2) the motion type corresponding to the video data. When the program 230 is executed, the processor 21 is caused to obtain the training data 234 from the storage unit 23, and train the image recognition model 232 according to the plurality of sets of training data 234 using the machine learning algorithm.

In other words, the video data of the plurality of sets of training data 234 may serve as training input data in a training phase period, and the motion types of the plurality of sets of training data 234 may serve as training output data in the training phase period. Once the processor 21 generates the image recognition model 232, the image recognition model 232 may be stored in the storage unit 23 for subsequent use.

It should be noted that, in some embodiments, the machine learning algorithm may be a convolutional neural network (CNN) algorithm, so as to build the image recognition model 232 for determining a motion type on the basis of the training data 234. In some examples, the CNN algorithm can include image processing and image recognition algorithms such as the you-only-look-once (YOLO) algorithm and ResNet 3D (R3D) algorithm; however, these algorithms are not intended to limit the machine learning algorithm in the present invention.

In some embodiments, in program codes of the CNN algorithm for training the image recognition model 232, a training function for training the image recognition model 232 is present. During the training period of the image recognition model 232, the training function may include a part for receiving the training data 234.

Further, the video data may serve as training input data, and the motion type corresponding to the video data may serve as training output data. Next, the training function may be performed after executing a main function of the program codes of the CNN algorithm to train the image recognition model 232. Once the image recognition model 232 is generated using the training data based on the CNN algorithm, the image recognition model 232 may be used to determine the motion type corresponding to the input video.

Figure 2B:
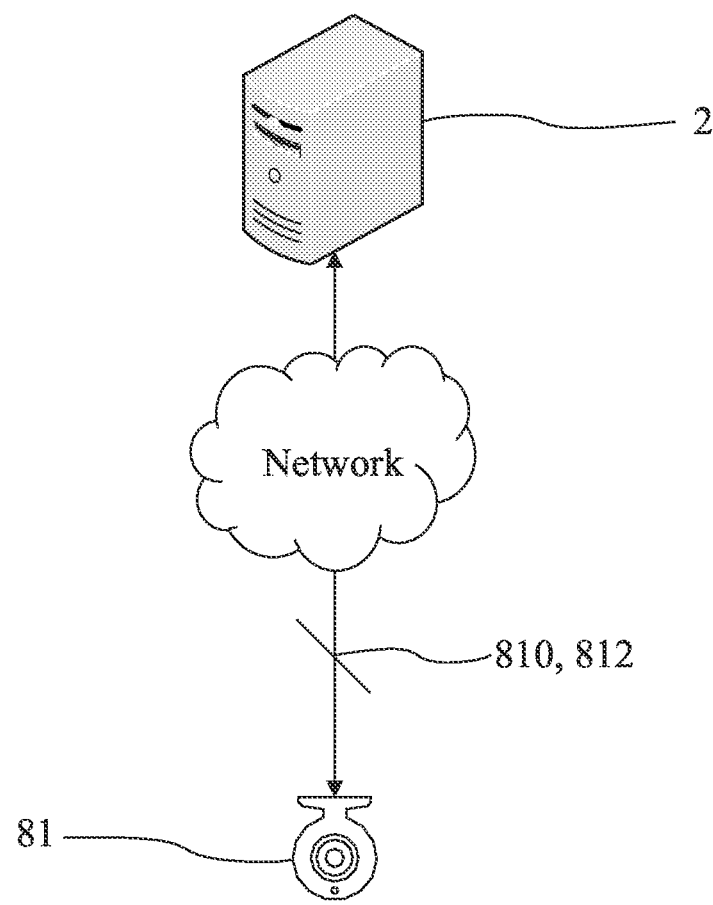
FIG. 2B is a schematic diagram of use of a monitoring system according to some embodiments of the present invention.
Figure 2B:
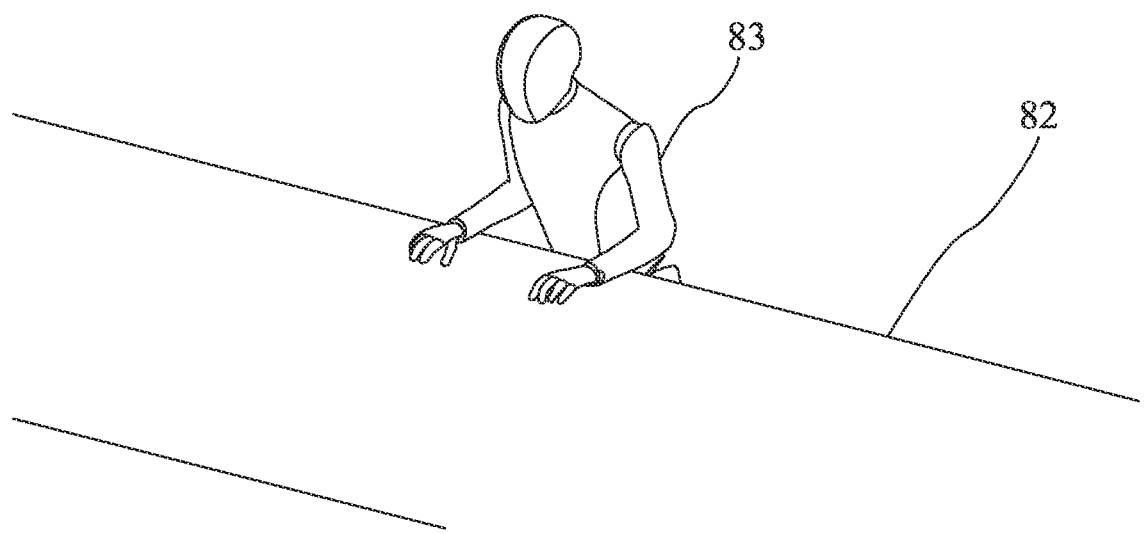

FIG. 2B is a schematic diagram of use of the monitoring system 2 according to some embodiments of the present invention. Specifically, when the operation of a production line machine 82 needs to be monitored and analyzed, an image capturing device 81 may be installed in an environment where the production line machine 82 is located, to capture video associated with the production line machine 82. The monitoring system 2 may be connected to the image capturing device 81 through a network connection (a wired network or a wireless network).

In some embodiments, when an operator 83 operates on the production line machine 82, the image capturing device 81 may, in real-time, capture a video 810 (e.g., a video stream) of the operator 83 with respect to the position of the production line machine 82, and send the video 810 to the monitoring system 2 through the network. In other words, the monitoring system 2 may obtain the video 810 of the operator 83 from the image capturing device 81 through the network.

In some embodiments, in order to enhance the conversion accuracy of the image recognition model 232, a video of the production line machine 82 captured on-site may serve as feedback data to adjust the image recognition model 232. Specifically, the video 810 may include a plurality of video clips, and the motion type of the operator 83 in each of the video clips may be determined by the processor 21 of the monitoring system 2 using the image recognition model 232 generated and stored in the storage unit 23.

Once the processor 21 has determined by the image recognition model 232 the motion type of the operator 83 in each of the video clips of the video 810, the monitoring system 2 may provide the video clip and the corresponding motion type to a user for the user to determine whether conversion bias of the image recognition model 232 exists.

In some embodiments, the monitoring system 2 may provide the video clip and the corresponding motion type to the user by a display (not shown) and a graphic user interface (GUI).

Next, if the user determines that a conversion error happens between a specific video clip and the corresponding motion type after utilizing the image recognition model 232, the user may input a user setting via the input device 25 to thereby change the motion type of the specific video clip to a correct motion type.

Then, the processor 21 may use the specific video clip and the corrected motion type to update the training data 234, and again use the updated plurality of sets of training data 234 to generate the image recognition model 232. More specifically, the processor 21 may use the original training data 234, at least one specific video clip and at least one motion type corresponding to the at least specific video clip to generate the image recognition model 232 based on the machine learning algorithm.

As such, the training data used by the image recognition model 232 for re-training includes data associated with the production line machine 82 and the operator 83 (i.e., the at least one specific video clip and the at least one motion type corresponding to the at least one specific video clip), and so the updated image recognition model 232 then has a higher conversion accuracy when applied to the environment of the production line machine 82.

The technique of using the video of the production line machine 82 captured on-site as feedback data to adjust the image recognition model 232 can be understood with better clarity with the following example. For example, the video 810 includes ten video clips C1 to C10, and the processor 21 of the monitoring system 2 may determine the motion type (e.g., a motion "picking up" or "putting down") of the operator 83 in each of the video clips C1 to C10 by the image recognition model 232 generated and stored in the storage unit 23.

Once the processor 21 has determined the motion types of the video clips C1 to C10 by the image recognition model 232, the monitoring system 2 provides the video clips C1 to C10 and the respective corresponding motion types to the user through the display and the GUI, for the user to determine whether conversion bias of the image recognition model 232 exists.

In this example, the motion types of the video clips C1 and C8 are respectively determined as "picking up" and "putting down" by the monitoring system 2. However, the user determines that the motion types of the video clips C1 and C8 should respectively be "putting down" and "picking up". Thus, the user inputs user settings via the input device 25 to correct the motion types of the video clips C1 and C8 to "putting down" and "picking up", respectively. Then, the processor 21 updates the training data 234 with the video clips C1 and C8 and the corrected motion types, and again uses the updated plurality of sets of training data 234 to re-generate the image recognition model 232.

In some embodiments, after the image recognition model 232 is updated by the foregoing step, when the operator 83 continues operating on the production line machine 82, the image capturing device 81 may capture a video 812 of the operator 83 with respect to the position of the production line machine 82, and send the video 812 to the monitoring system 2 through the network. In other words, the monitoring system 2 may obtain the video 812 of the operator 83 from the image capturing device 81 through the network. The video 812 includes a plurality of video clips.

Next, by the image recognition model 232 updated and stored in the storage unit 23, the processor 21 of the monitoring system 2 may determine the motion type of each of the video clips of the video 812. Each video clip carries information associated with a timestamp, and thus the processor 21 may determine a capturing timing of each video clip and further determine a time of occurrence and a motion period of the motion type represented by each video clip. The processor 21 may record the motion types and the motion periods in the storage unit 23 for subsequent use.

In some embodiments, the processor 21 determines whether the motion period of a corresponding motion type exceeds a period threshold with respect to each video clip stored in the storage unit 23. If so, the motion type and the corresponding video clip are tagged, and the motion type, the time of occurrence and the period of occurrence corresponding to this video clip are recorded in a log file. Thus, the user may efficiently call a tagged video clip from the video 812 according to the log file, and further understand the reasons why the motion periods of the motion types in the video clips exceed the period threshold, so as to quickly eliminate the factors resulting in the delay.

For example, it is default that the motion "picking up" should be completed within 3 seconds, and so the processor 21 determines, with respect to all video clips corresponding to the motion "picking up", whether the motion periods thereof exceed the value of 3 seconds. If so, the motion type and the corresponding video clip are tagged, and the motion type, the time of occurrence and the period of occurrence corresponding to this video clip are recorded in a log file. Thus, the user can efficiently call the tagged video clip from the video 812 according to the log file, and further understand the reasons why the motion periods of the motion types in the video clips exceed 3 seconds, so as to quickly eliminate the factors resulting in the delay.

In some embodiments, the processor 21 may determine, with respect to two successive video clips all stored in the storage unit 23, whether a time difference between times of occurrence of the two corresponding motion types exceed a time threshold. If so, the two motion types and the two corresponding video clips are tagged, and the motion types, the times of occurrence and the periods of occurrence corresponding to the two video clips are recorded in a log file. Thus, the user may efficiently call the two tagged video clips from the video 812 according to the log file, and further understand the reasons why the time difference between the times of occurrence of the two corresponding motion types exceeds the time threshold, so as to quickly eliminate the factors resulting in the delay.

For example, it is default that an associated component configuration operation between the motion "picking up" and the motion "putting down" that take place successively should be completed within 10 seconds, and so the processor 21 determines, with respect to two video clips of the motion "picking up" and the motion "putting down" that take place successively, whether the time difference therebetween exceeds 10 seconds. If so, the two motion types and the two corresponding video clips are tagged, and the motion types, the times of occurrence and the periods of occurrence corresponding to the two video clips are recorded in a log file. Thus, the user can efficiently call the two tagged video clips from the video 812 according to the log file, and further understand the reasons why the time difference between the times of occurrence of the two corresponding motion types exceeds 10 seconds, so as to quickly eliminate the factors resulting in the delay.

Figure 2C:
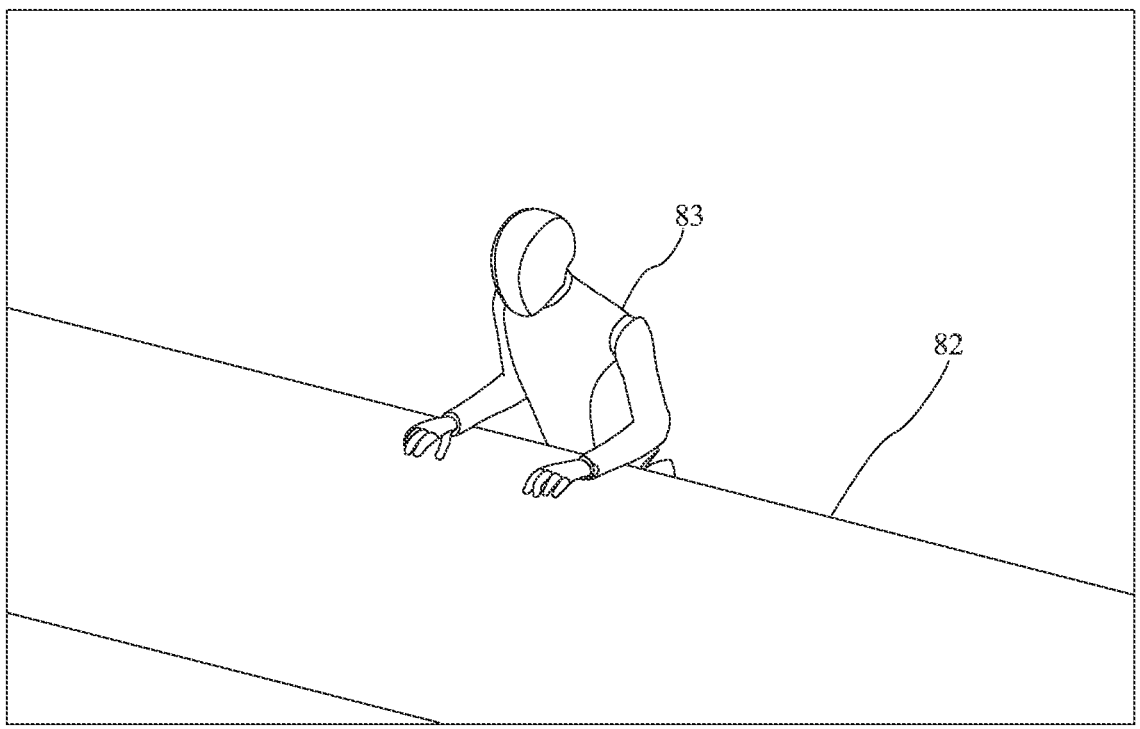
FIGS. 2C to 2F are schematic diagrams of images captured by an image capturing device according to some embodiments of the present invention.

FIG. 2C is a schematic diagram of an image captured by the image capturing device 81 according to some embodiments of the present invention. In some embodiments, since the range of the image or video captured by the image capturing device 81 is larger, more hardware resources and time are consumed when the processor 21 processes the image or video by the image recognition model 232.

However, not the entire range of image or video captured by the image capturing device 81 needs to be monitored, and so a region having a smaller range to be monitored may be defined for the captured image or video. The processor 21 then processes the image or video with respect to the region having a smaller range by the image recognition model 232, thereby significantly accelerating a processing speed.

Figure 2D:
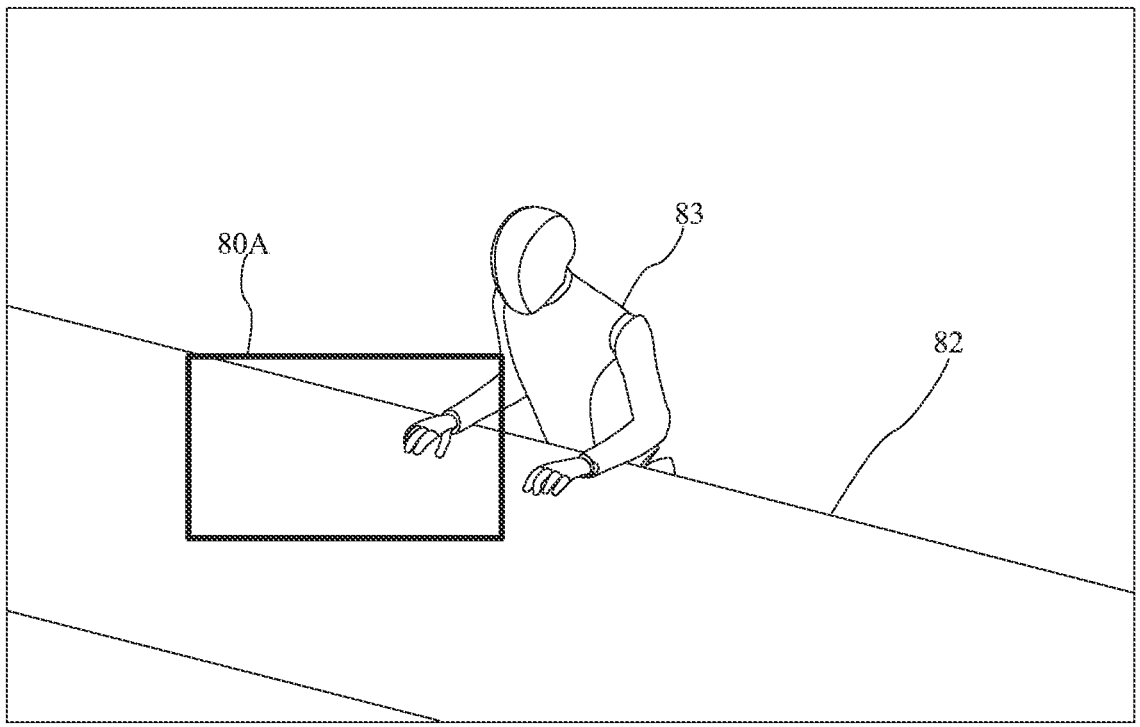

FIG. 2D is another schematic diagram of an image captured by the image capturing device 81 according to some embodiments of the present invention. Specifically, the user may input a user setting via the input device 25 to define a monitoring region 80A in a range of the image captured by the image capturing device 81. The processor 21 only needs to process the image or video within the monitoring region 80A by the image recognition model 232. As such, since the size of the image or video within the monitoring region 80A is smaller, a processing speed of the monitoring system 2 may be significantly accelerated.

In some embodiments, when a change (e.g., the angle of the image capturing device 81 is adjusted, the deployment of the operator is changed, the position of the operator is changed, and so on) occurs in the on-site environment of the production line machine 82, the originally intended monitoring region may be deviated from the monitoring region 80A, leading to an increased conversion error of the image recognition model 232. At this point in time, the user may directly adjust the position of the monitoring region 80A so as to reduce the offset brought by the change in the on-site environment of the production line machine 82.

Figure 2E:
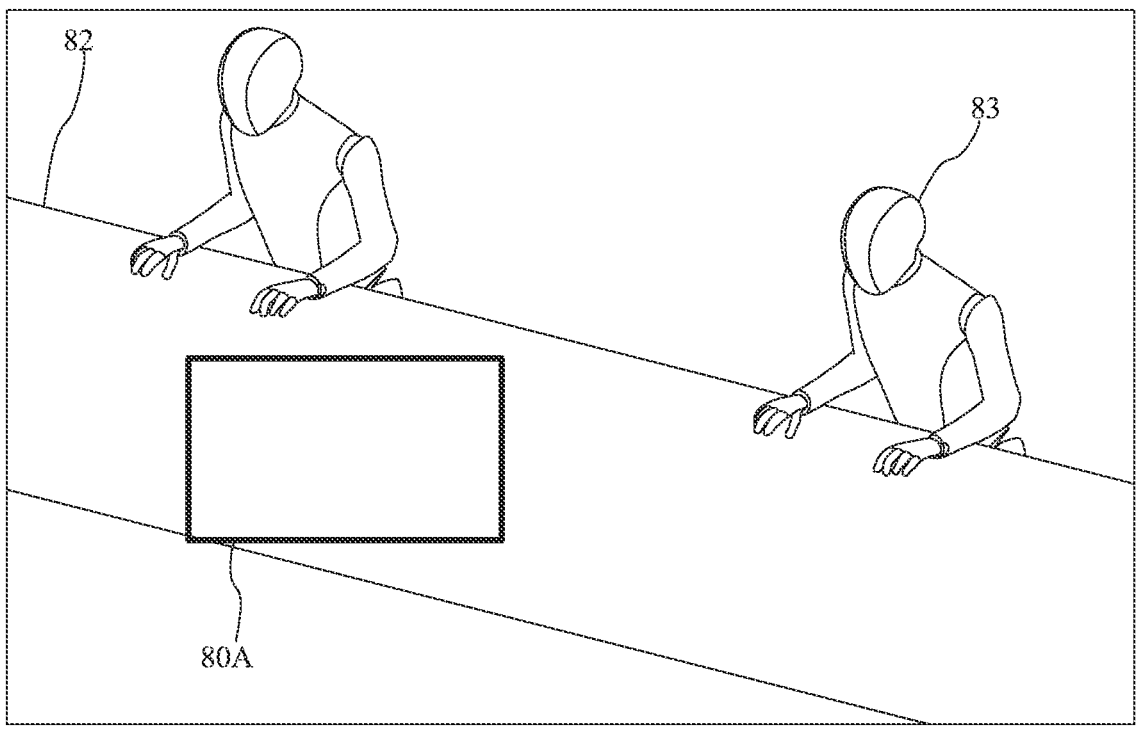

FIG. 2E is another schematic diagram of an image captured by the image capturing device 81 according to some embodiments of the present invention. Specifically, due to a change occurring in the on-site environment of the production line machine 82, the image or video within the monitoring region 80A is not contents needing to be monitored, which may lead to an increased conversion error of the image recognition model 232.

Figure 2F:
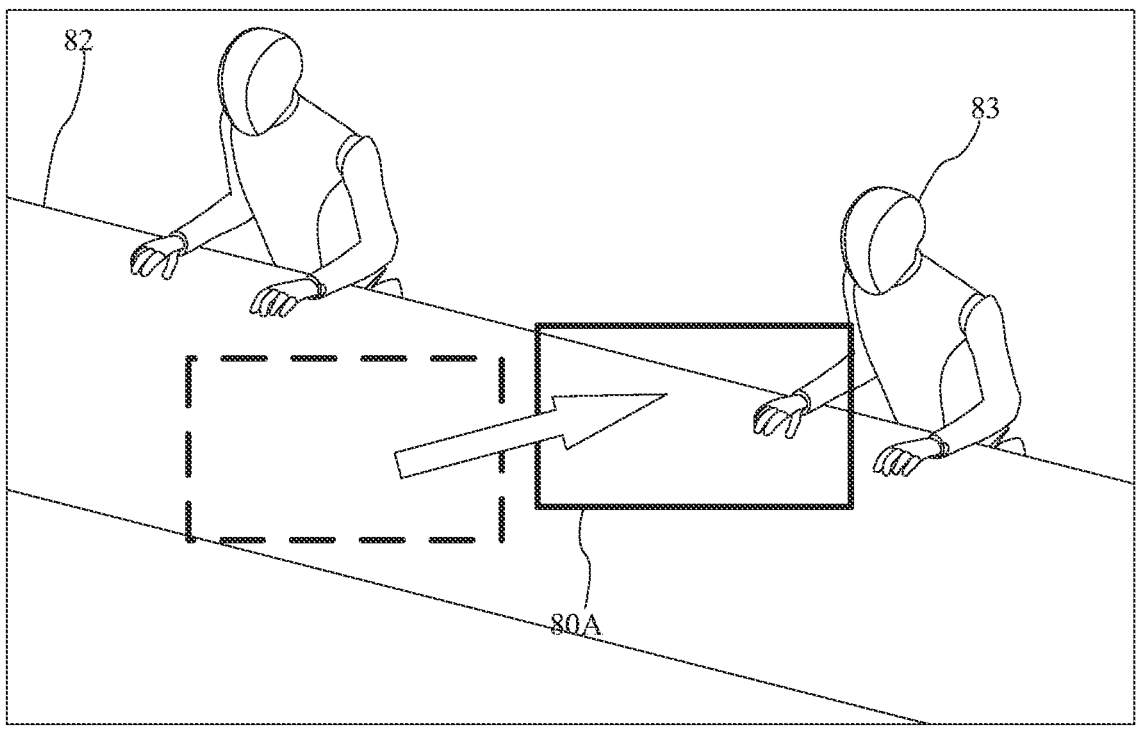

FIG. 2F is another schematic diagram of an image captured by the image capturing device 81 according to some embodiments of the present invention. Specifically, the user may input another user setting via the input device 25 to move the monitoring region 80A in the range of the image captured by the image capturing device 81, so as to restore the region needing to be monitored back to normal.

In some embodiments, the images captured by the image capturing device 81 may be first transmitted to the monitoring system 2. Then, the monitoring system 2 may display the images by a common display (not shown), and receive the user setting via the input device 25 such as a keyboard or a mouse for the monitoring system 2 to complete an associated operation.

In some embodiments, the images captured by the image capturing device 81 may be first transmitted to the monitoring system 2. Then, the monitoring system 2 may transmit the images to a display at a remote end (e.g., a handheld smart device or a laptop computer) by a network, and receive the user setting via the input device 25 such as a network interface for the monitoring system 2 to complete an associated operation.

Figure 3A:
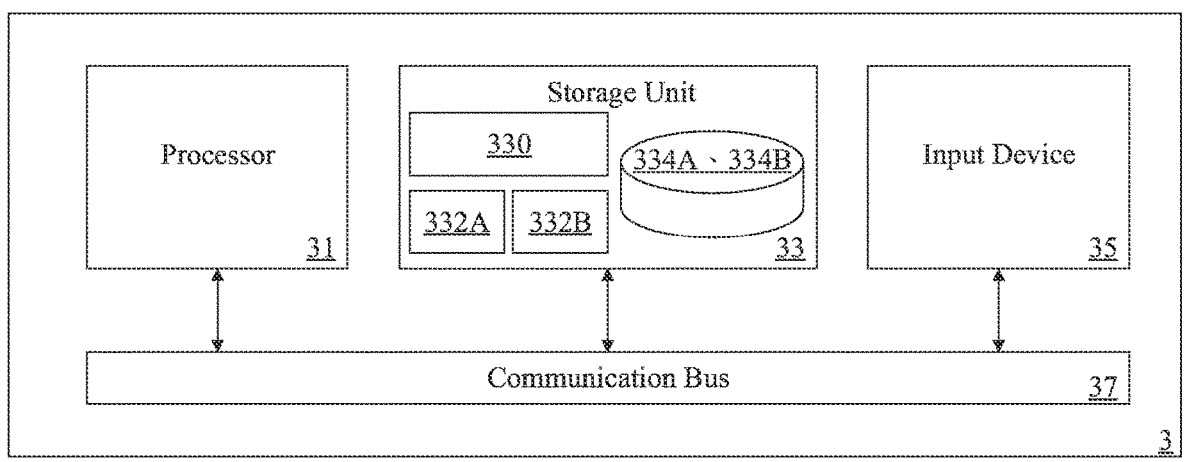
FIG. 3A is a block diagram of a monitoring system according to some embodiments of the present invention.

FIG. 3A is a block diagram of a monitoring system 3 according to some embodiments of the present invention. The monitoring system 3 includes a processor 31, a storage unit 33 and an input device 35. The storage unit 33 stores a program 330, an image recognition model 332A, an image recognition model 332B and training data 334A and 334B. The image recognition models 332A and 332B may include models associated with machine learning technology and are used to determine a motion type of an operator or a change in the number of objects in video data (i.e., image sequence data).

The processor 31, the storage unit 33 and the input device 35 are electrically connected by a communication bus 37. Through the communication bus 37, the processor 31 may execute the program 330 stored in the storage unit 33. One or more interrupts, e.g., a software interrupt, can be generated when the program 330 is executed to cause the processor 31 to execute the program 330 having a production line monitoring function. The function of the program 330 is to be further described below.

In some embodiments, the image recognition model 332A may be a machine learning model generated using a plurality sets of training data 334A according to a machine learning algorithm. Specifically, some video data and the motion types corresponding to the video data may serve as training data to train the image recognition model 332A based on the machine learning algorithm (i.e., generating the image recognition model 332A).

More specifically, each set of training data 334A may include (1) video data, and (2) the motion type corresponding to the video data. When the program 330 is executed, the processor 31 is caused to obtain the training data 334A from the storage unit 33, and train the image recognition model 332A using the machine learning algorithm according to the plurality of sets of training data 334A.

In other words, the video data of the plurality of sets of training data 334A may be used as training input data in a training phase period, and the motion types of the plurality of sets of training data 334A may be used as training output data in the training phase period. After the processor 31 generates the image recognition model 332A, the image recognition model 332A may be stored in the storage unit 33 for subsequent use.

In some embodiments, in the plurality of sets of training data 334A, the video data serving as training input data includes image data of the motion of the operator, and the motion type corresponding to the video data may serve as training output data. Next, program codes of the CNN algorithm may be executed to train the image recognition model 332A. After the image recognition model 332A is generated using the training data based on the CNN algorithm, the image recognition model 332A may be used for determining the motion type corresponding to the input video.

In some embodiments, the image recognition model 332B may be a machine learning model generated using the plurality of sets of training data 334B according to a machine learning algorithm. Specifically, some video data and a change in the number of objects corresponding to the video data may serve as training data for training the image recognition model 332B based on the machine learning algorithm (i.e., generating the image recognition model 332B).

More specifically, each set of training data 334B may include (1) video data, and (2) a change (e.g., an increase or a decrease) in the number of objects corresponding to the video data. When the program 330 is executed, the processor 31 is caused to obtain the training data 334B from the storage unit 33 and train the image recognition model 332B using the machine learning algorithm according to the plurality of sets of training data 334B.

In other words, the video data of the plurality of sets of training data 334B may serve as training input data in a training phase period, and the change in the number of objects of the plurality of sets of training data 334B may serve as training output data in the training phase period. After the processor 31 generates the image recognition model 332B, the image recognition model 332B may be stored in the storage unit 33 for subsequent use.

In some embodiments, in the plurality of sets of training data 334B, the video data serving as training input data includes image data of the change in the number of objects, and the change in the number of objects corresponding to the video data may serve as training output data. Next, program codes of the CNN algorithm can be executed to train the image recognition model 332B. After the image recognition model 332B is generated using the training data based on the CNN algorithm, the image recognition model 332B may be used to determine the change in the number of objects corresponding to the input video.

More specifically, the video data records the change in the number of specific objects (e.g., parts of a product), and the change in the number of specific objects may represent different motions or behaviors. For example, when the change in the number of specific objects in the video data is a decrease, it means that the probability that the motion of the operator is "picking up" the specific objects is higher. When the change in the number of specific objects in the video data is an increase, it means that the probability that the motion of the operator is "putting down" the specific objects is higher. Accordingly, the accuracy of a determination result for a motion type may be enhanced using the change in the number of specific objects in the image data.

Figure 3B:
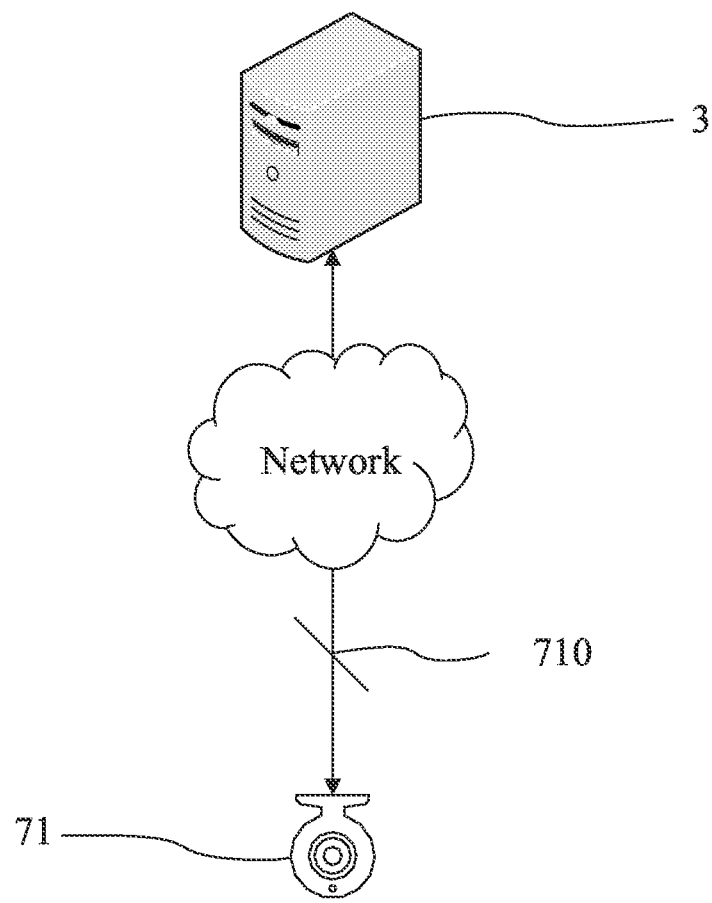
FIG. 3B is a schematic diagram of use of a monitoring system according to some embodiments of the present invention/
Figure 3B:
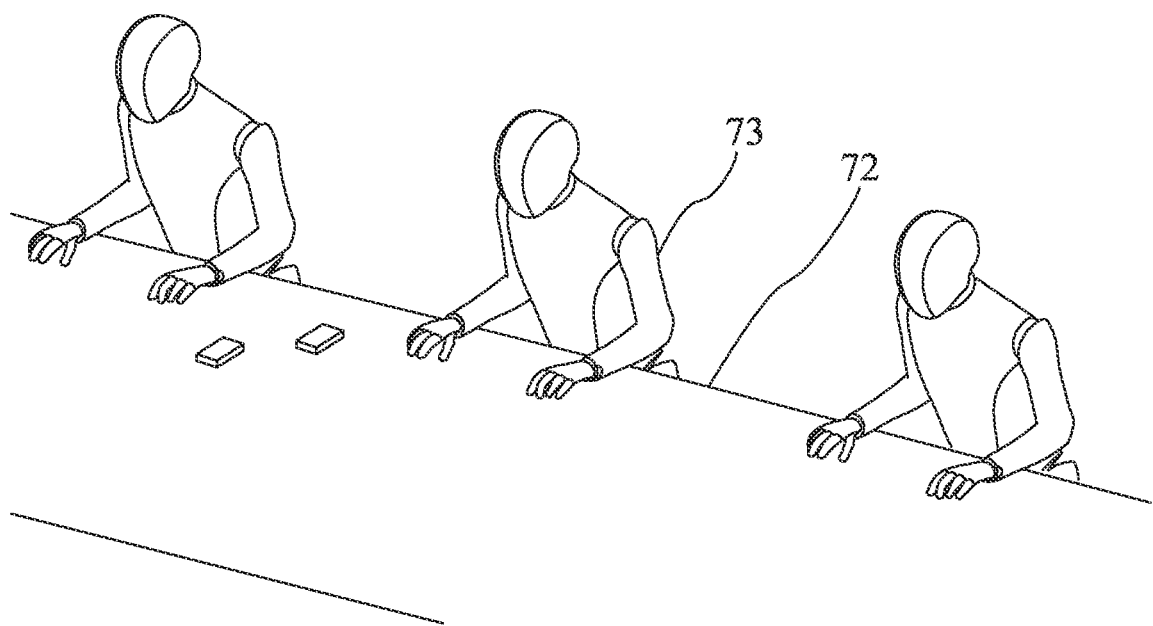

FIG. 3B is a schematic diagram of use of the monitoring system 3 according to some embodiments of the present invention. Specifically, when the operation of a production line machine 72 needs to be monitored and analyzed, an image capturing device 71 may be installed in an environment where the production line machine 72 is located, to capture a video associated with the production line machine 72. The monitoring system 3 may be connected to the image capturing device 71 by a network connection (a wired network or a wireless network).

In some embodiments, when an operator 73 operates on the production line machine 72, the image capturing device 71 may capture in real time a video 710 (e.g. a video stream) of the operator 73 with respect to the position of the production line machine 72, and send the video 710 to the monitoring system 3 through the network. In other words, the monitoring system 3 may obtain the video 710 of the operator 73 from the image capturing device 71 through the network. The video 710 includes a plurality of video clips.

Next, the user may input a user setting via the input device 35, to define monitoring regions 70A and 70B in the range of the image captured by the image capturing device 71, and the processor 31 only needs to process the image or video within the monitoring regions 70A and 70B by the image recognition models 332A and 332B.

Then, the processor 31 of the monitoring system 3 may determine the motion types within the monitoring regions 70A and 70B in each of video clips of the video 710 by the image recognition model 332A stored in the storage unit 33. Since each video clip carries information associated with a timestamp, the processor 31 may determine the capturing timing of each video clip, and further determine times of occurrence and motion periods of motion types represented by the monitoring regions 70A and 70B in each video clip.

The processor 31 may record the motion types and the motion periods in the storage unit 33 for subsequent use.

Figure 3C:
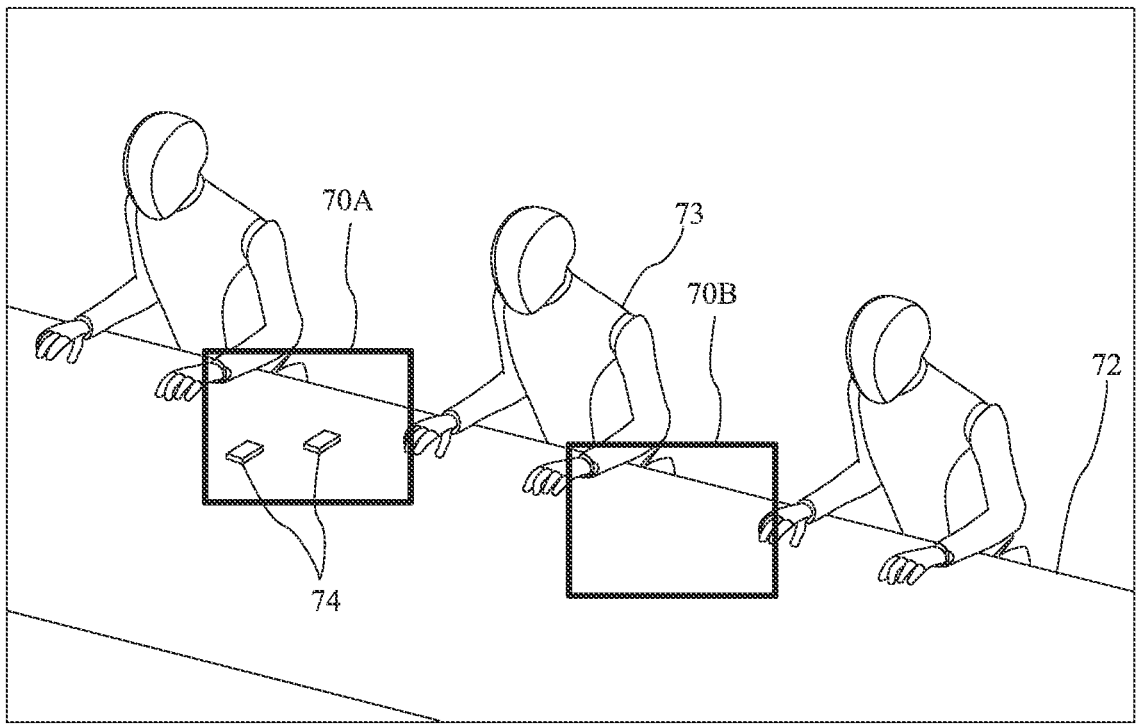
FIGS. 3C to 3F are schematic diagrams of images captured by an image capturing device according to some embodiments of the present invention.
Figure 3D:
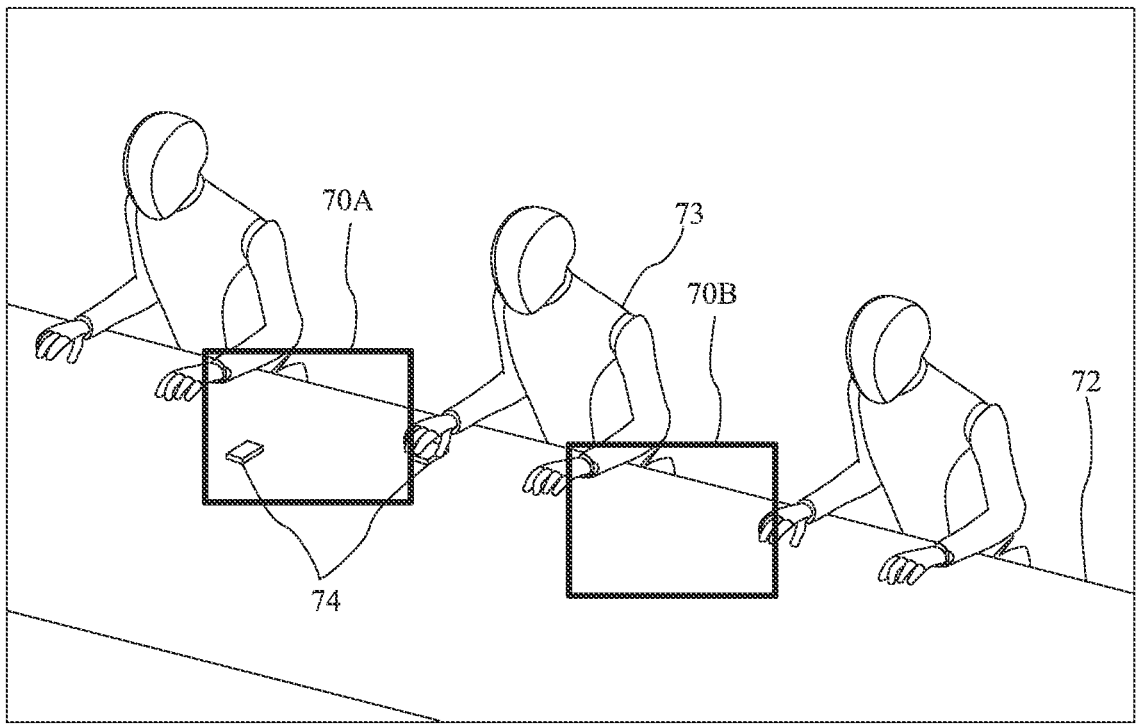

In some embodiments, with respect to the monitoring regions 70A and 70B of each video clip, the processor 31 of the monitoring system 3 may further determine the change in the number of objects by the image recognition model 332B, and accordingly update the motion type of the operator 73. FIGS. 3C and 3D are schematic diagrams of images captured by the image capturing device 71 according to some embodiments of the present invention. For example, with respect to the monitoring region 70A of a specific video clip, the processor 31 of the monitoring system 3 may first determine that the motion type is "picking up" by the image recognition model 332A.

Next, with respect to the monitoring region 70A of the specific video clip, the processor 31 of the monitoring system 3 may further determine by the image recognition model 332B that the number of objects 74 in the video clip is decreased. Accordingly, in the monitoring region 70A, the motion type of the specific video clip is "picking up", and the decrease in the number of the objects 74 is in fact caused by "picking up". Thus, the specific motion type may be accurately determined as "picking up".

It should be noted that, with respect to the monitoring region 70A of the specific video clip, the processor 31 of the monitoring system 3 determines by the image recognition model 332A that the motion type is "putting down"; however, when the image recognition model 332B determines that the number of the objects 74 in the video clip is decreased, it means that the determination of the image recognition model 332A may be incorrect. Accordingly, based on that the image recognition model 332B determines that the number of the objects 74 in the video clip is decreased, the processor 31 of the monitoring system 3 may update the motion type corresponding to the specific video clip from "putting down" to "picking up".

Figure 3E:
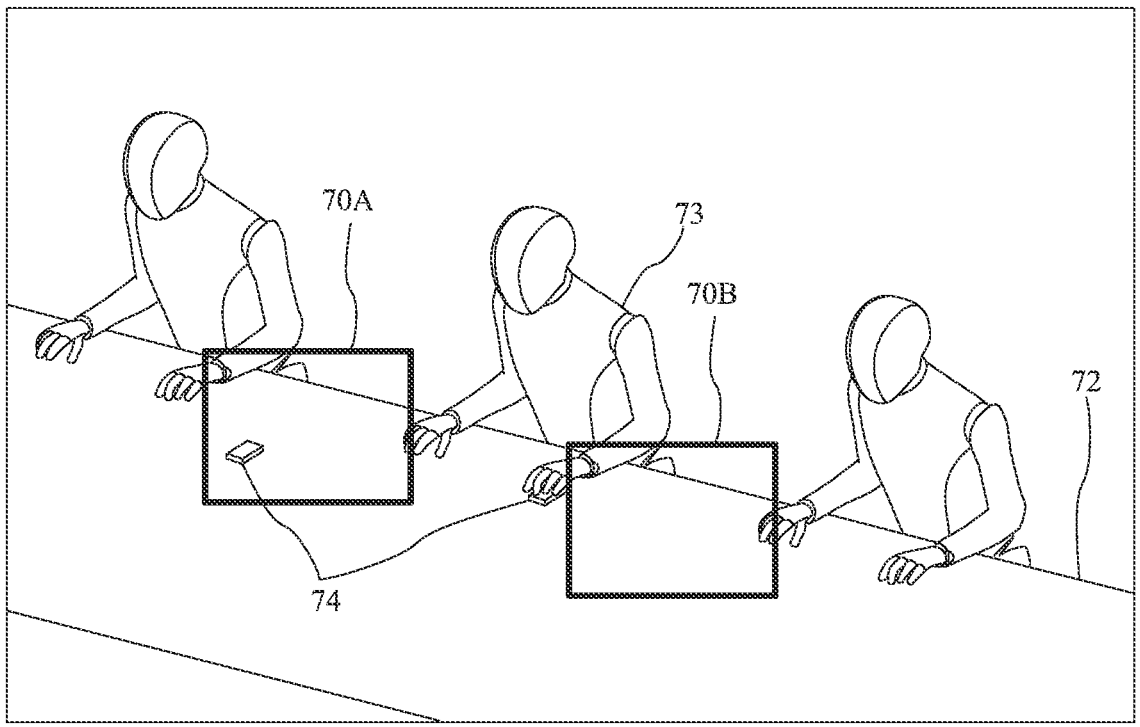
Figure 3F:
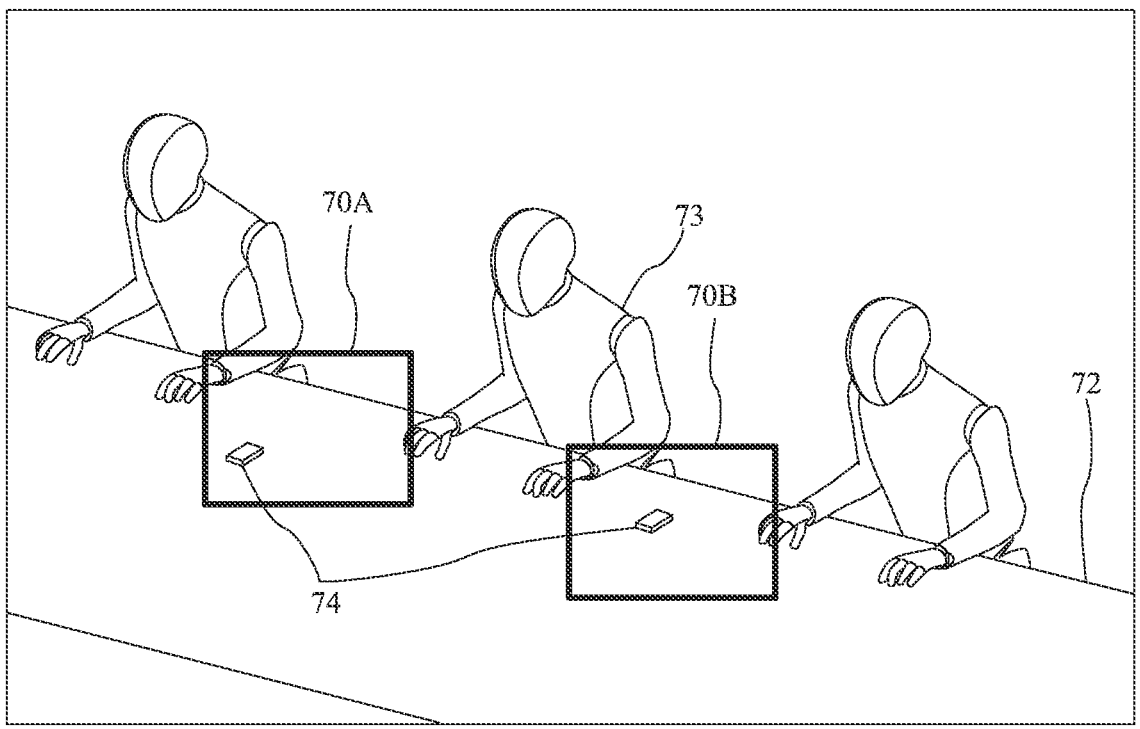

FIGS. 3E and 3F are schematic diagrams of images captured by the image capturing device 71 according to some embodiments of the present invention. For example, with respect to the monitoring region 70B of the specific video clip, the processor 31 of the monitoring system 3 may first determine by the image recognition model 332A that the motion type is "putting down".

Next, with respect to the monitoring region 70B of the specific video clip, the processor 31 of the monitoring system 3 may further determine by the image recognition model 332B that the number of objects 74 in the video clip is increased. Accordingly, in the monitoring region 70B, the motion type of the specific video clip is "putting down", and the increase in the number of the objects 74 is in fact caused by "putting down". Thus, the specific motion type may be accurately determined as "putting down".

Similarly, with respect to the monitoring region 70B of the specific video clip, the processor 31 of the monitoring system 3 determines by the image recognition model 332A that the motion type is "picking up"; however, when the image recognition model 332B determines that the number of the objects 74 in the video clip is increased, it means that the determination of the image recognition model 332A may be incorrect. Accordingly, based on that the image recognition model 332B determines that the number of the objects 74 in the video clip is increased, the processor 31 of the monitoring system 3 may update the motion type corresponding to the specific video clip from "picking up" to "putting down".

It should be noted that, in the foregoing embodiment, when the processor determines the motion type of the image or video data by the image recognition model, the hand of an operator may be first identified and tracked by the image recognition model, and then the motion type of the operator in the image or video is determined according to the motion of the hand of the operator.

Figures 4A, 4B:
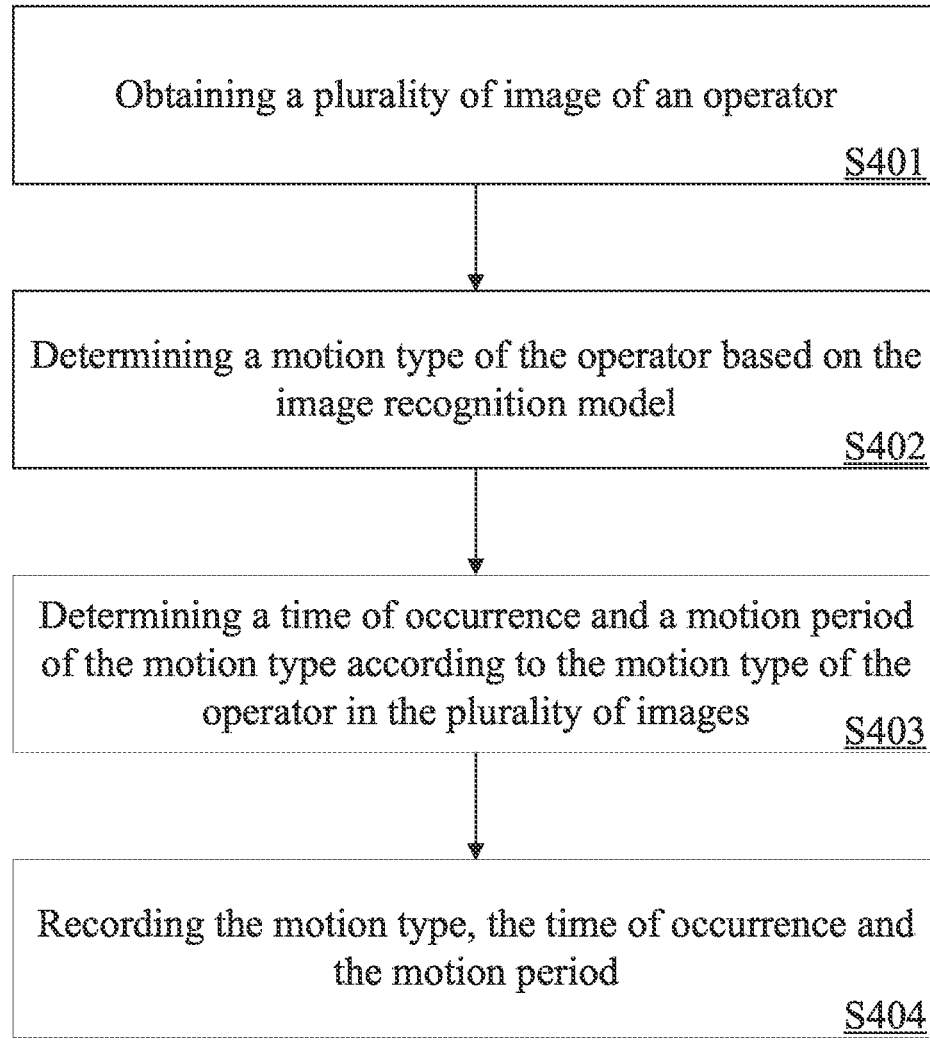
FIGS. 4A and 4B are flowcharts of a production line monitoring method according to some embodiments of the present invention.

Some embodiments of the present invention include a production line monitoring method, and flowcharts thereof are as shown in FIGS. 4A and 4B. The production line monitoring method of these embodiments is implemented by a monitoring system (e.g., the monitoring systems in the foregoing embodiments). Details of the operation of the method are described below.

First, step S401 is executed to obtain, by the monitoring system, a plurality of images of an operator. The monitoring system may obtain the plurality of images of the operator by an image capturing device disposed at a production line machine. Step S402 is executed to determine, by the monitoring system, a motion type of the operator in the plurality of images based on the image recognition model. The image recognition model may include a model associated with machine learning technology, and is used to receive image data and output the motion type of the operator in the images.

Next, since the plurality of images may carry information associated with timestamps, step S403 is executed to determine, by the monitoring system, a time of occurrence and a motion period of the motion type according to the motion type of the operator in the plurality of images. Step S404 is executed to record, by the monitoring system, the motion type, the time of occurrence and the motion period for subsequent use.

In some embodiments, after step S402, in order to enhance determination accuracy, step S402' is optionally executed to update, by the monitoring system, the motion type according to a change in the number of objects in the plurality of images based on another image recognition model.

Some embodiments of the present invention include a production line monitoring method, and flowcharts thereof are as shown in FIGS. 5A to 5F. The production line monitoring method of these embodiments is implemented by a monitoring system (e.g., the monitoring systems in the foregoing embodiments). Details of the operation of the method are described below.

In some embodiments, the production line monitoring method needs to provide an image recognition model including associated machine learning technology, to receive image data and output a motion type of an operator in images. Thus, an image recognition model needs to be trained and generated using training data.

Figure 5A:
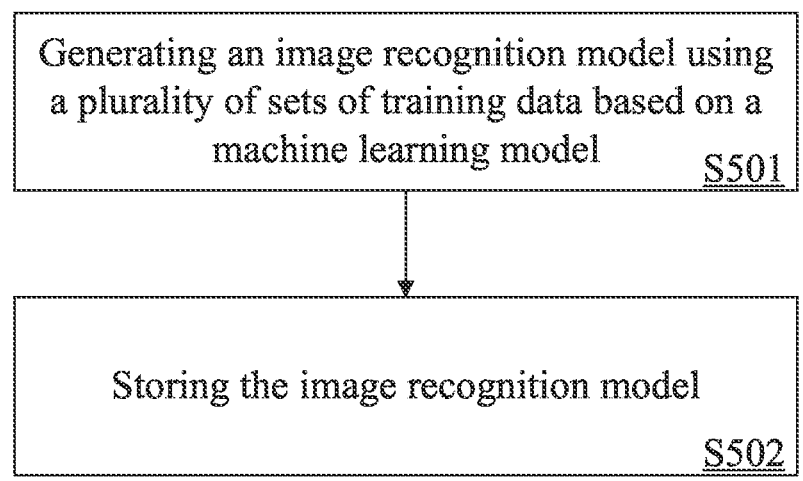

FIG. 5A is a flowchart of generating an image recognition model in the production line monitoring method according to some embodiments of the present invention. Step S501 is executed to generate, by the monitoring system, an image recognition model using a plurality of sets of training data based on a machine learning algorithm. Each set of training data includes a training input and a training output. The training input includes training video clips, and the training output includes training motion types corresponding to the training video clips. Step S502 is executed to store, by the monitoring system, the image recognition model for subsequent use.

Figure 5B:
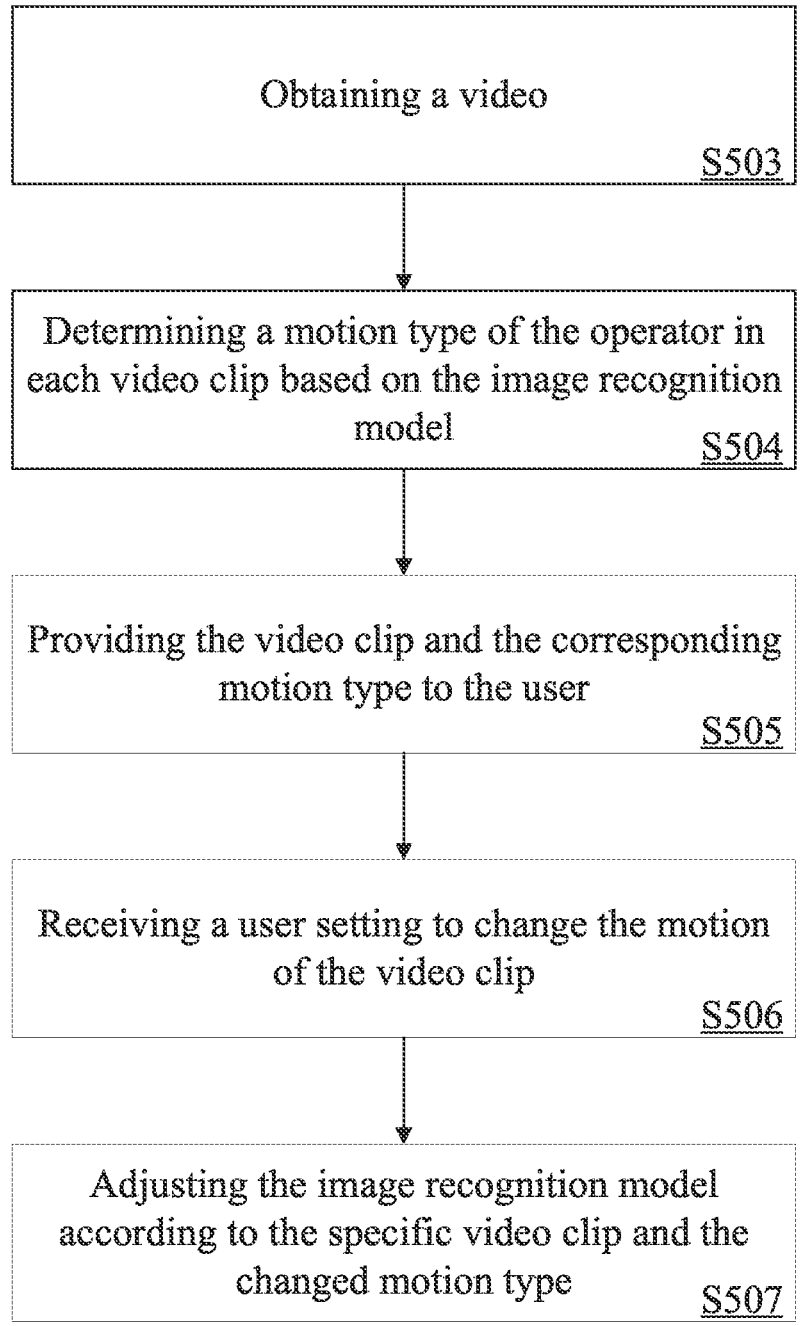

In some embodiments, in order to enhance the accuracy of the image recognition model, a video of the production line machine captured on-site may serve as feedback data to adjust the image recognition model. FIG. 5B is a flowchart of updating the image recognition model of the production line monitoring method according to some embodiments of the present invention. Step S503 is executed to obtain, by the monitoring system, a video. The monitoring system may capture the video of an operator by an image capturing device disposed on a production line machine, and the video includes a plurality of video clips.

Step S504 is executed to determine, by the monitoring system, a motion type of the operator in each video clip based on the generated image recognition model. Step S505 is executed to provide, by the monitoring system, the video clip and the corresponding motion type to the user for the user to determine whether there is any conversion bias of the image recognition model.

When the user determines that there is a conversion bias of the image recognition model such that the specific video clip does not match with the corresponding motion type, the user may change the specific video clip and the corresponding motion type. Step S506 is executed to receive, by the monitoring system, a user setting so as to change the motion type of the video clip.

Once determination for all video clips is completed, step S507 is executed to adjust, by the monitoring system, the image recognition model according to the specific video clip and the changed motion type. Specifically, the monitoring system generates the image recognition model according to the original training data, the specific video clip, the motion type corresponding to the specific video clip and the machine learning algorithm.

As such, the training again performed by the image recognition model includes data associated with the production line machine and the operator (i.e., the specific video clip and the motion type corresponding to the specific video clip), and so the updated image recognition model then has a higher accuracy when applied to the determination of the production line machine.

Figure 5C:
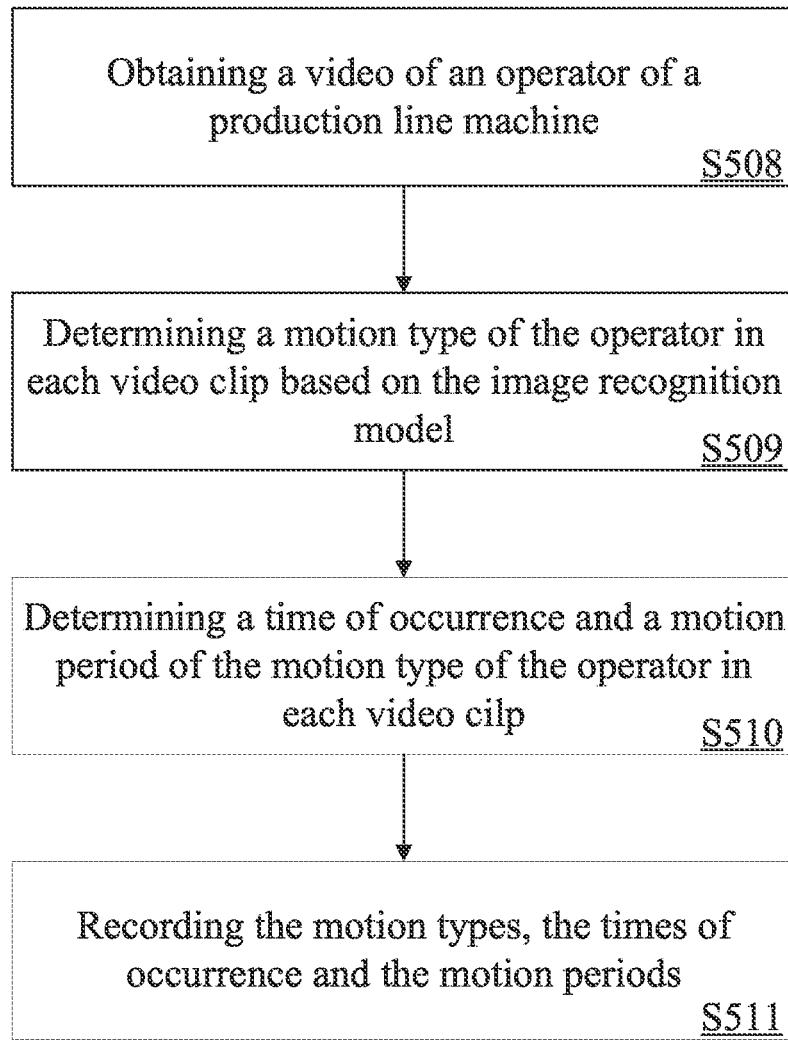

In some embodiments, the state of a production line machine may be monitored based on the updated image recognition model. FIG. 5C is a flowchart of a production line monitoring method according to some embodiments of the present invention. Step S508 is executed to obtain, by the monitoring system, a video of an operator of a production line machine. The video includes a plurality of video clips. Step S509 is executed to determine, by the monitoring system, a motion type of the operator in each video clip based on the image recognition model.

Next, since the plurality of video clips may carry information associated with timestamps, step S510 is executed to determine, by the monitoring system, a time of occurrence and a motion period of the motion type according to the motion type of the operator in each video clip. Step S511 is executed to record, by the monitoring system, the motion types, the times of occurrence and the motion periods for subsequent use.

Figure 5D:
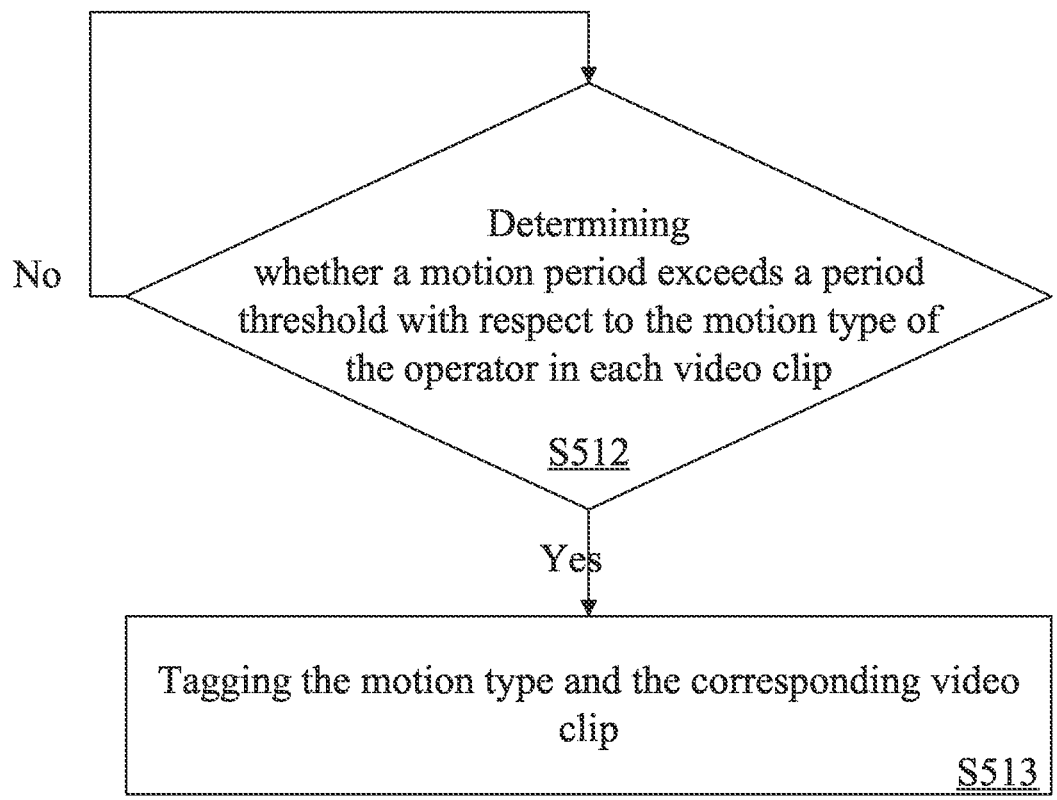

In some embodiments, the monitoring system may determine whether a delay has occurred in a motion in the video. FIG. 5D is a flowchart of a production line monitoring method according to some embodiments of the present invention. Step S512 is executed to determine, by the monitoring system, whether a motion period exceeds a period threshold with respect to the motion type of the operator in each video clip. If so, step S513 is executed to tag, by the monitoring system, the motion type and the corresponding video clip, and record the motion type, the time of occurrence and the period of occurrence corresponding to the video clip in a log file, for the user to efficiently call the tagged video clip from the video according to the log file. If not, step S512 is executed to determine, by the monitoring system, whether the motion period of the motion type of the operator in the next video clip exceeds the period threshold.

Figure 5E:
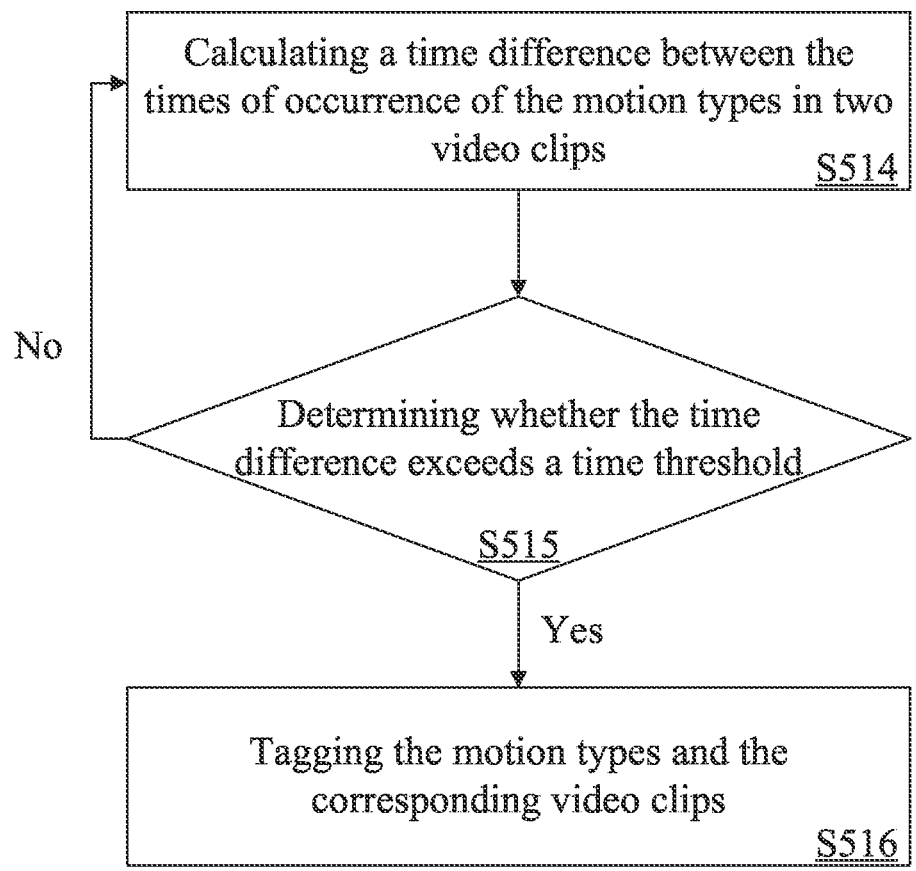

In some embodiments, the monitoring system may determine whether a delay has occurred between a motion and another motion in the video. FIG. 5E is a flowchart of a production line monitoring method according to some embodiments of the present invention. Step S514 is executed to calculate, by the monitoring system, a time difference between the times of occurrence of the motion types in two video clips. Step S515 is executed to determine, by the monitoring system, whether the time difference exceeds a time threshold. If so, step S516 is executed to tag, by the monitoring system, the motion types and the two corresponding video clips, and record the motion types, the times of occurrence and the periods of occurrence corresponding to the two video clips in a log file, for the user to efficiently call the tagged video clips from the video according to the log file. If not, step S514 is executed to calculate, by the monitoring system, the time difference between the times of occurrence of the motion types corresponding to the next pair of video clips and determine whether the motion period thereof exceeds the period threshold.

In some embodiments, the following step may be optionally added to accelerate the speed and efficiency of image processing. FIG. 5F is a flowchart of a production line monitoring method according to some embodiments of the present invention. Step S517 is executed to receive, by the monitoring system, a user setting for defining a monitoring region in a video needing to be captured. In other words, the user setting is for defining a monitoring region in the range of the image captured by the image capturing device. Because the size of the image or video within the monitoring region is smaller, the processing speed of the monitoring system can be significantly accelerated.

In some embodiments, the following step may be optionally added to reduce an offset brought by the change in an on-site environment of the production line machine. FIG. 5G is a flowchart of a production line monitoring method according to some embodiments of the present invention. Step S518 is executed to receive, by the monitoring system, a user setting for moving a monitoring region. In other words, the user setting is for moving a monitoring region in the range of the image captured by the image capturing device.

The monitoring system and the production line monitoring method of the present invention described above are capable of more quickly and accurately identifying factors causing errors or delays in a production line by means of automation and artificial intelligence, thereby enhancing the output efficiency of the production line and effectively improving the output bottleneck of the production line.

It should be understood that, the processor described in the foregoing embodiments can be a central processing unit (CPU), other hardware circuitry components capable of executing related instructions, or a combination of computing circuitry generally known to a person skilled in the art on the basis of the disclosure above. In addition, the storage unit described in the foregoing embodiments can include a memory (e.g., ROM and RAM) or a storage device (e.g., a flash memory, HDD and SDD) for storing data.

Further, the communication bus described in the foregoing embodiments can include a communication interface for transmitting data between elements such as processors, storage units and input devices, and can include an electrical bus interface, an optical bus interface or even a wireless bus interface; however, such description is not to be construed as limitations to the embodiments of hardware implementation scenarios of the present invention.

Although the present invention and the advantages thereof are described in detail as above, it should be understood that various changes, replacements and substitutions can be made to the present disclosure without departing from the spirit and scope of the present invention defined by the appended claims. For example, the numerous processes discussed above can be implemented by different methods, and be replaced by other processes or combinations thereof.

Moreover, the scope of the present application is not intended to limit the specific embodiments of the processes, machines, manufacturing, substance compositions, components, methods and steps described in the present disclosure. A person skilled in the art can easily understand from the disclosure of the present invention that, according to the present invention, processes, machines, manufacturing, substance compositions, components, methods or steps that currently exist or are to be developed subsequently can be used to perform substantially the same functions as those in the corresponding embodiments described herein or to achieve substantially the same results as those in the corresponding embodiments described herein. Therefore, the appended claims are intended to encompass such processes, machines, manufacturing, substance compositions, components, methods or steps.

What is claimed is:

1. A production line monitoring method for a monitoring system, comprising:
    generating an image recognition model by using a plurality of sets of training data based on a machine learning algorithm, wherein each set of training data comprises a training input and a training output, the training input comprises a training video clip, and the training output comprises a training motion type corresponding to the training video clip;
    obtaining a video, wherein the video comprises a plurality of video clips;
    determining a motion type of a first video clip of the video clips based on the image recognition model;
    updating the motion type of the first video according to a change in a number of objects in the first video based on another image recognition model; and
    generating the image recognition model by using the plurality of sets of training data, the first video clip, the motion type corresponding to the first video clip and the machine learning algorithm.

2. The production line monitoring method of claim 1, further comprising:
    receiving a user setting to change the motion type of a first video clip of the plurality of video clips.

* * * * *